(12) United States Patent
Eshima et al.

(10) Patent No.: US 9,502,871 B2
(45) Date of Patent: Nov. 22, 2016

(54) ELECTRIC CABLE

(71) Applicant: HITACHI METALS, LTD., Tokyo (JP)

(72) Inventors: Hirotaka Eshima, Hitachi (JP); Fumihito Oka, Hitachi (JP); Nobuyuki Yamashita, Hitachi (JP); Yoshikazu Hayakawa, Hitachi (JP); Tomonori Shibata, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 57 days.

(21) Appl. No.: 14/497,483

(22) Filed: Sep. 26, 2014

(65) Prior Publication Data

US 2015/0090474 A1    Apr. 2, 2015

(30) Foreign Application Priority Data

Sep. 27, 2013 (JP) ................................. 2013-200817

(51) Int. Cl.
| | |
|---|---|
| *H01B 7/18* | (2006.01) |
| *H02G 3/04* | (2006.01) |
| *H02G 11/00* | (2006.01) |
| *B60R 16/02* | (2006.01) |

(52) U.S. Cl.
CPC ......... *H02G 3/0481* (2013.01); *B60R 16/0215* (2013.01); *H02G 11/00* (2013.01); *B60R 16/0207* (2013.01)

(58) Field of Classification Search
CPC B60R 16/0215; H02G 11/00; H02G 3/0481; H01B 7/185
USPC ........................................................ 174/107
See application file for complete search history.

(56) References Cited

U.S. PATENT DOCUMENTS

| | | | | |
|---|---|---|---|---|
| 1,757,030 A | * | 5/1930 | Watson ................ | H01B 9/0611 |
| | | | | 156/55 |
| 1,906,968 A | * | 5/1933 | Vassar ...................... | H01B 9/00 |
| | | | | 138/28 |

(Continued)

FOREIGN PATENT DOCUMENTS

| | | |
|---|---|---|
| JP | 61080527 U1 | 5/1986 |
| JP | 2010-114019 A | 5/2010 |
| JP | 5273284 B1 * | 8/2013 |

OTHER PUBLICATIONS

Office Action dated Aug. 2, 2016 issued in corresponding Japanese Application No. JP2013 200817, filed May 29, 1986, together with partial English translation.

*Primary Examiner* — Timothy Thompson
*Assistant Examiner* — Charles Pizzuto
(74) *Attorney, Agent, or Firm* — Scully Scott Murphy and Presser; Paul Esatto

(57) ABSTRACT

An electric cable includes a wire section that includes an electric wire including a conductor and a braided shield layer covering an outer periphery of the conductor and including a plurality of metal wires braided, and a cylindrical outer layer section covering an outer periphery of the wire section and including a cylindrical sheath and a braided reinforcement layer that covers an inner surface of the sheath and includes a plurality of fibers braided. The wire section is arranged inside the cylindrical outer layer section. The outer layer section is constructed such that a permissible region is formed in the cylindrical outer layer section that allows a displacement of the wire section with respect to the outer layer section in a direction orthogonal to a length direction of the wire section.

6 Claims, 7 Drawing Sheets

(56) References Cited

U.S. PATENT DOCUMENTS 7,989,700 B2 8/2011 Eshima
8,948,556 B2* 2/2015 Yu .......................... G02B 6/44
385/101
2010/0116541 A1* 5/2010 Eshima ................ H01B 7/1865
174/388

* cited by examiner

ELECTRIC CABLE

The present application is based on Japanese patent application No. 2013-200817 filed on Sep. 27, 2013, the entire contents of which are incorporated herein by reference.

BACKGROUND OF THE INVENTION

1. Field of the Invention

The invention relates to an electric cable and, in particular, to an electric cable including a wire section and a protective section to protect the wire section.

2. Description of the Related Art

In recent years, according to the spread of robots and the use of electric/electronic devices in automobiles etc., electric cables are used even in an environment in which cables are repeatedly bent. The electric cables have a structure in which a wire section composed of one or multiple electric wires is protected by a sheath provided therearound. For fixing the electric cables, a method is known in which a cylindrical portion of a metal fitting for fixing the cable (hereinafter, simply referred to as "fitting") is fitted outside of the electric cable and crimped there.

Another type of electric cable is known in which a braided shield layer is provided on the outer periphery of an electric wire constituting the wire section and a braided reinforcement layer is provided on the inner surface of a sheath contacting with the braided shield layer (see e.g. JP-A-2010-114019).

The configuration of the electric cable allows an improvement in tensile strength of the sheath.

SUMMARY OF THE INVENTION

When the cylindrical portion of the fitting is fitted and crimped outside of the electric cable as described above, a force of the cylindrical portion to grip the electric cable (hereinafter, simply referred to as "gripping force") becomes larger as the cylindrical portion is more deformed by crimping. However, since the sheath of the electric cable is generally formed of a rubber material, there is a possibility that the electric cable slips out of the cylindrical portion due to lack of the gripping force unless the sheath is tightened from the outside by crimping the cylindrical portion with a considerably strong force.

In the electric cable provided with the braided shield layer and the braided reinforcement layer, when the cylindrical portion fitted to the electric cable is crimped, minute surface roughness of the braided reinforcement layer bites into the inner peripheral surface of the sheath due to a tightening force generated by crimping. Therefore, a sufficient gripping force is obtained at the crimping portion of the cylindrical portion even if a force of tightening the sheath generated by crimping the cylindrical portion is not increased too much.

However, the electric cable has the following disadvantages when used in automobiles etc., especially when wired in an automobile between the underneath of a spring (a portion below a suspension spring) and an automobile body. In the use environment, the electric cable is repeatedly bent due to up-and-down motion (bound and rebound etc.) of wheels and every time the braided shield layer is strongly rubbed with the braided reinforcement layer in a state of being in contact with each other. Therefore, the braided shield layer and the braided reinforcement layer are likely to be worn out. The wear of the braided shield layer leads to a decrease in the shielding effect while the wear of the braided reinforcement layer leads to a decrease in tensile strength. This makes it difficult to maintain good electrical characteristics or physical characteristics of the electric cable for a long period.

It is an object of the invention to provide an electric cable that allows an improvement in wear and abrasion resistance of a braided shield layer and a braided reinforcement layer.

(1) According to one embodiment of the invention, an electric cable comprises:

a wire section that comprises an electric wire comprising a conductor and a braided shield layer covering an outer periphery of the conductor and comprising a plurality of metal wires braided; and a cylindrical outer layer section covering an outer periphery of the wire section and comprising a cylindrical sheath and a braided reinforcement layer that covers an inner surface of the sheath and comprises a plurality of fibers braided, wherein the wire section is arranged inside the cylindrical outer layer section, and wherein the outer layer section is constructed such that a permissible region is formed in the cylindrical outer layer section that allows a displacement of the wire section with respect to the outer layer section in a direction orthogonal to a length direction of the wire section.

In the above embodiment (1) of the invention, the following modifications and changes can be made.

(i) The permissible region forms a void.

(ii) The braided shield layer and the braided reinforcement layer are arranged adjacent to each other in the direction orthogonal to the length direction of the wire section.

(iii) A reduced diameter portion formed by reducing a diameter of the cylindrical outer layer section is provided at a portion in the length direction of the wire section, and the wire section is positioned on the central axis of the cylindrical outer layer section by the reduced diameter portion.

(iv) The wire section comprises an insulation layer arranged between the conductor and the braided shield layer.

(v) The void is filled with a filling material in the form of sponge or liquid.

Effects of the Invention

According to one embodiment of the invention, an electric cable can be provided that allows an improvement in wear and abrasion resistance of a braided shield layer and a braided reinforcement layer.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

Figure 1:
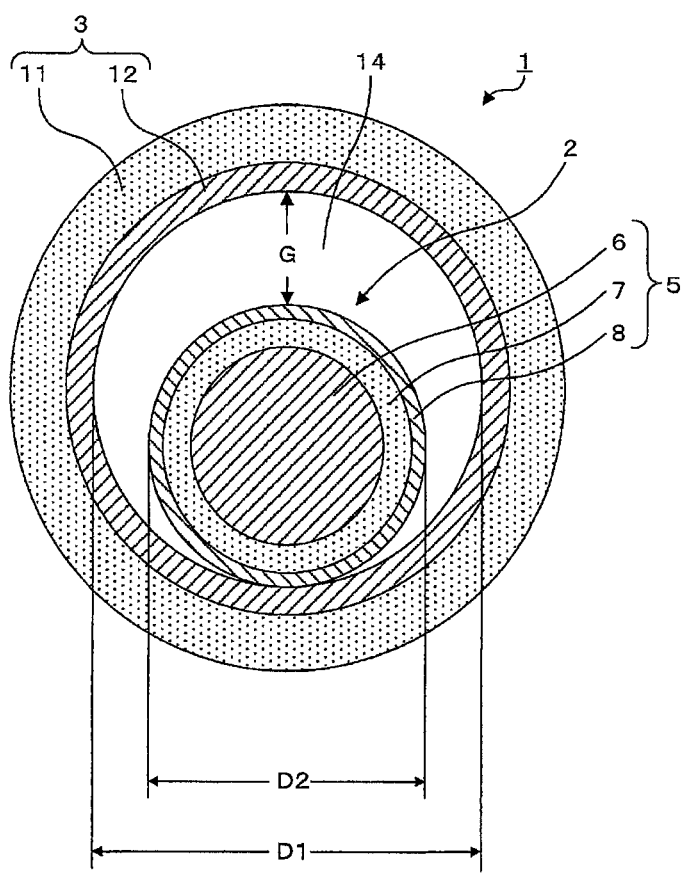
FIG. 1 is a cross sectional view showing a configuration example of an electric cable in an embodiment of the present invention.

The embodiment of the invention will be described in detail below in reference to the drawings. The embodiment of the invention will be described in the following order:
1. Use environment of electric cable
2. Configuration of electric cable
3. Technical purposes of providing braided reinforcement layer
4. Relation between wire section and protective section
5. Method of manufacturing electric cable
6. Functions and effects of the embodiment
7. Modifications etc.

1. Use Environment of Electric Cable

The electric wire in the embodiment of the invention is used as a power cable, a signal cable or a composite cable thereof in the fields of, e.g., industrial robot and automobile. When used for automobiles, electric cables are often used in an environment in which the cables are repeatedly bent. The electric cable in the present embodiment exerts remarkable effects especially in such a use environment.

2. Configuration of Electric Cable

FIG. 1 is a cross sectional view showing a configuration example of an electric cable in the embodiment of the invention.

An electric cable 1 illustrated in the drawing has appropriate flexibility and is roughly composed of a wire section 2 and a cylindrical protective section 3 as an outer layer section covering an outer peripheral side of the wire section 2. It should be noted that, in the present specification, a length direction of the wire section 2 of the electric cable 1 is also simply called "the length direction" and a diametrical direction of the protective section 3 of the electric cable 1 is also called as "the radial direction of the cable".

Wire Section

The wire section 2 is constituted by one electric wire 5. The electric wire 5 has a conductor 6, an insulation layer 7 covering the outer periphery of the conductor 6, and a braided shield layer 8 covering the outer peripheral side of the conductor 6 via the insulation layer 7. Here, the braided shield layer 8 is provided as an example of a shield layer.

Conductor

The conductor 6, as a core of the electric wire 5, is located on the central axis of the electric wire 5. The conductor 6 can be formed using, e.g., a wire conductor formed of tin-plated soft copper (having, e.g., a conductor cross sectional area (SQ) of 3 mm$^2$). The conductor 6 may be constituted by one wire conductor or a twisted wire formed by twisting plural wire conductors together. Alternatively, the conductor 6 may be formed using a metal wire, e.g., a soft copper wire, a silver-plated soft copper wire and a tinned copper alloy wire, etc.

Insulation Layer

The insulation layer 7 is formed concentrically with the conductor 6 so as to cover the entire outer periphery of the conductor 6. The insulation layer 7 is arranged between the conductor 6 and the braided shield layer 8. The insulation layer 7 is formed to have a constant thickness (e.g., 0.7 mm in thickness). The insulation layer 7 can be formed of, e.g., cross-linked polyethylene (XLPE). Alternatively, the insulation layer 7 may be formed of a resin material such as polyethylene, foamed polyethylene, cross-linked foamed polyethylene, polypropylene or fluorine resin.

Braided Shield Layer

The braided shield layer 8 has an electric shield function and is formed to cover the entire outer periphery of the insulation layer 7. The braided shield layer 8 is formed around the conductor 6 as a core and concentrically with the insulation layer 7. A tinsel copper formed by providing a copper foil on the periphery of a core fiber or thread can be used to form the braided shield layer 8. The shield layer 8 is formed by crossing and weaving, i.e., braiding, plural tinsel coppers. Note that, in the present embodiment, fiber is in the form of fine thread. In addition, thread is in the form of continuous linear fiber.

The core of the tinsel copper used for forming the braided shield layer 8 can be formed of a fiber or thread of a polymer resin material. In detail, the tinsel copper can be formed using, e.g., a core thread of polyethylene terephthalate (PET) having a diameter of 0.11 mm. The core thread can be formed of a single fiber or thread. Alternatively, the core thread may be formed by spinning plural fibers or threads. The copper foil can be formed to have a thickness of, e.g., 12 μm. The tinsel copper is then formed by spirally winding the copper foil around an outer periphery of the core thread.

A plating film may be additionally provided on the surface of the tinsel copper. It is possible to prevent oxidation of the copper foil surface by providing the plating film on the surface of the tinsel copper. The plating film can be formed by, e.g., tinning. Prevention of oxidation of the copper foil surface by the plating film then allows adverse effects, such as an increase in electric resistance of the braided shield layer 8, to be suppressed.

Protective Section

The protective section 3 is to protect the wire section 2 and has a cylindrical sheath 11 and a braided reinforcement layer 12 which covers the inner surface of the sheath 11. Here, the braided reinforcement layer 12 is provided as an example of a braided layer.

Sheath

The sheath 11 constitutes a jacket of the electric cable 1. The sheath 11 is formed to have a circular cross section. Thus, the protective section 3 is formed in a cylindrical shape as a whole. The wire section 2 mentioned above is arranged (housed) in a cylinder portion of the protective section 3. The sheath 11 is located on the outermost side in the radial direction of the cable. Thus, the outer peripheral surface of the sheath 11 constitutes the outer peripheral surface of the electric cable 1. The sheath 11 is formed of an insulating material. In detail, the sheath 11 is formed of, e.g., a rubber material such as ethylene-propylene-diene rubber so as to have a thickness of about 0.5 mm. For the sheath 11, it is preferable to use a rubber material exhibiting excellent characteristics in heat resistance, weather resistance and oil resistance. As an example, it is possible to use rubber materials for brake hose.

As the rubber materials for brake hose, it is possible to use an ethylene-α-olefin-polyene copolymer containing a polyene which is a norbornene compound containing a vinyl group at the terminal. In addition, a rubber material, in which the ethylene-α-olefin-polyene copolymer containing a polyene which is a norbornene compound containing a vinyl group at the terminal is mixed with a SiH group-containing compound containing plural SiH groups per molecule, can be used (hereinafter, referred to as "mixed rubber material"). Note that, the mixed rubber material may appropriately contain agents such as reinforcing agent, filler, plasticizer, softener, processing aid, activator, anti-scorching agent and antioxidant as long as the function of the sheath 11 is exerted. Alternatively, the mixed rubber material may be formed by blending plural polymer materials.

As the rubber material, it is also possible to use ethylene-propylene-diene rubber, styrene-butadiene rubber, butyl rubber, nitrile rubber and chloroprene rubber. In the present embodiment, the rubber material is preferably a mixed rubber material which can be vulcanized under no pressure. Here, the ethylene-α-olefin-polyene copolymer constituting the mixed rubber material is a copolymer consisting of three or more monomers including ethylene, α-olefin and polyene, and it is possible to use, e.g., ethylene-propylene-diene rubber (EPDM).

As the α-olefin, it is possible to use propylene, 1-butene, 4-methyl-1-pentene, 1-hexene, 1-heptene and 1-octene, etc. Meanwhile, as the polyene typified by dienes, it is possible to use dicyclopentadiene, 1,4-hexadiene, 3-methyl-1,4-hexadiene, 5-methyl-1,4-hexadiene, 7-methyl-1,6-octadiene, 5-ethylidene-2-norbornene, 5-methylene-2-norbornene and 5-vinyl-2-norbornene, etc.

The SiH group-containing compound constituting the mixed rubber material is used as a crosslinking agent for the mixed rubber material. In the present embodiment, it is preferable to use the SiH group-containing compound in which two or more SiH groups are contained per molecule, and preferably, three or more SiH groups are contained for the purpose of improving a degree of crosslinking. In addition, the mixed rubber material may contain a catalyst and a reaction inhibitor. A catalyst which accelerates hydrosilylation reaction between the ethylene-α-olefin-polyene copolymer and the SiH group-containing compound is used. It is possible to use, e.g., platinum-based catalysts, palladium-based catalysts and rhodium-based catalysts, etc.

Meanwhile, the reaction inhibitor is appropriately added to the mixed rubber material for the purpose of suppressing an excessive hydrosilylation reaction. As the reaction inhibitor, it is possible to use, e.g., benzotriazole, hydroperoxide, ethynylcyclohexanol, tetramethylethylenediamine, triallyl cyanurate, acrylonitrile and acryl-maleate, etc.

Braided Reinforcement Layer

The braided reinforcement layer 12 is formed to cover the entire inner peripheral surface of the sheath 11. The braided reinforcement layer 12 is formed concentrically with the sheath 11 in the state of being in contact with (firmly attached to) the inner peripheral surface of the sheath 11. The braided reinforcement layer 12 is formed by crossing and weaving, i.e., braiding, plural fibers or threads. The fiber or thread is formed of, e.g., a synthetic resin such as polyvinyl alcohol so as to have a diameter of 0.1 mm. In addition, the fiber or thread is preferably formed of a material excellent in resistance to fatigue and wear and abrasion resistance. Besides polyvinyl alcohol, at least one material selected from polyethylene terephthalate and polyethylene-2,6-naphthalate can be used to form the fiber or thread. The fiber or thread used for forming the braided reinforcement layer 12 is preferably formed of polyvinyl alcohol.

3. Technical Purposes of Providing Braided Reinforcement Layer

In the present embodiment, the braided reinforcement layer 12 is provided on the inner periphery of the sheath 11. There are mainly two technical purposes of providing the braided reinforcement layer 12 in the electric cable 1.

The first technical purpose is to increase a gripping force at the time of fixing the electric cable 1 by crimping a cylindrical portion of a fitting. That is, in case that the braided reinforcement layer 12 is provided on the inner periphery of the sheath 11, minute surface roughness of the braided reinforcement layer 12 bites into the inner peripheral surface of the sheath 11 due to a tightening force generated by crimping when the cylindrical portion of the non-illustrated fitting is fitted and crimped onto the outside of the electric cable 1. Therefore, a sufficient gripping force is obtained at the crimping portion of the cylindrical portion even if a force of tightening the sheath 11 generated by crimping the cylindrical portion is not increased too much.

The second technical purpose is to increase tensile strength of the electric cable 1. That is, in case that the braided reinforcement layer 12 formed by weaving polyethylene terephthalate fibers, etc., is provided on the inner periphery of the sheath 11, elongation of the entire cable is suppressed by the braided reinforcement layer 12 when a tensile force in the length direction is applied to the electric cable 1 for some reason. This reduces damage on the wire section 2 when the tensile force is applied to the electric cable 1. As such, it is possible to improve tensile strength of the electric cable 1.

4. Relation Between Wire Section and Protective Section

Next, a relation between the wire section 2 and the protective section 3 will be described.

Firstly, a conventional electric cable will be briefly described. The conventional electric cable is configured such that the wire section and the protective section are in tight contact with each other based on the concept of reducing a diameter of the entire cable as much as possible. Therefore, the wire section and the protective section are rubbed with each other at a contact interface when the electric cable is bent. In addition, the position of the wire section is fixed inside the protective section. Therefore, the wire section is largely distorted when the electric cable is bent.

In contrast to this, in the electric cable 1 of the present embodiment, an permissible region 14 is provided in the cylinder portion of the protective section 3 in which the wire section 2 is arranged. The permissible region 14 is a portion which allows the wire section 2 to move in the cylinder portion of the protective section 3 in a direction orthogonal to the length direction (including the radial direction of the cable). The permissible region 14 is a void (cavity). Therefore, the wire section 2 arranged in the cylinder portion of the protective section 3 can move freely to some extent in the direction orthogonal to the length direction. In other words, the wire section 2 and the protective section 3 are relatively movable with a movement distance of about 1.0 mm to 30 mm in the radial direction of the cable. Inside the cylinder portion of the protective section 3, the wire section 2 can move (slide) also in the length direction.

In the present embodiment, an inner diameter D1 of the protective section 3 is set to be larger than an outer diameter D2 of the electric wire 5 constituting the wire section 2 so that the permissible region 14 is provided in the cylinder portion of the protective section 3. In the present embodiment, the innermost layer of the protective section 3 is the braided reinforcement layer 12. Thus, the inner diameter D1 of the protective section 3 is a dimension taking the thickness of the braided reinforcement layer 12 into the calculation. Meanwhile, the outermost layer of the electric wire 5 is the braided shield layer 8. Thus, the outer diameter D2 of the electric wire 5 is a dimension taking the thickness of the braided shield layer 8 into the calculation.

Due to such a dimensional relation, a void having a crescent moon shape in cross section is formed as the permissible region 14 in the cylinder portion of the protective section 3 in the state that the position of the electric wire 5 is off-center on, e.g., the lower side such that the lower portion of the braided shield layer 8 is in contact with the braided reinforcement layer 12 as shown in the drawing. In addition, in this state, a cavity with the maximum dimension G is provided between the upper portion of the braided shield layer 8 and the braided reinforcement layer 12 facing thereto. The dimension G of the cavity in this state corresponds to a dimensional difference between the inner diameter D1 of the protective section 3 and the outer diameter D2 of the electric wire 5. In case of providing the permissible region 14 in the cylinder portion of the protective section 3, a dimensional difference between the inner diameter D1 of the protective section 3 and the outer diameter D2 of the electric wire 5 can be appropriately changed.

Direction in which Wire Section can Move in Protective Section

Here, when the wire section 2 (the electric wire 5) is arranged off-center on the lower side in the cylinder portion of the protective section 3 as shown in the illustrated example, the direction in which the wire section 2 can move is an upper side or an obliquely upper side where the permissible region 14 is present. In other words, the wire section 2 can move toward a portion where the permissible region 14 is present. This also applies to the case where the electric wire 5 is arranged off-center in any of up, down, left and right directions.

Figure 2:
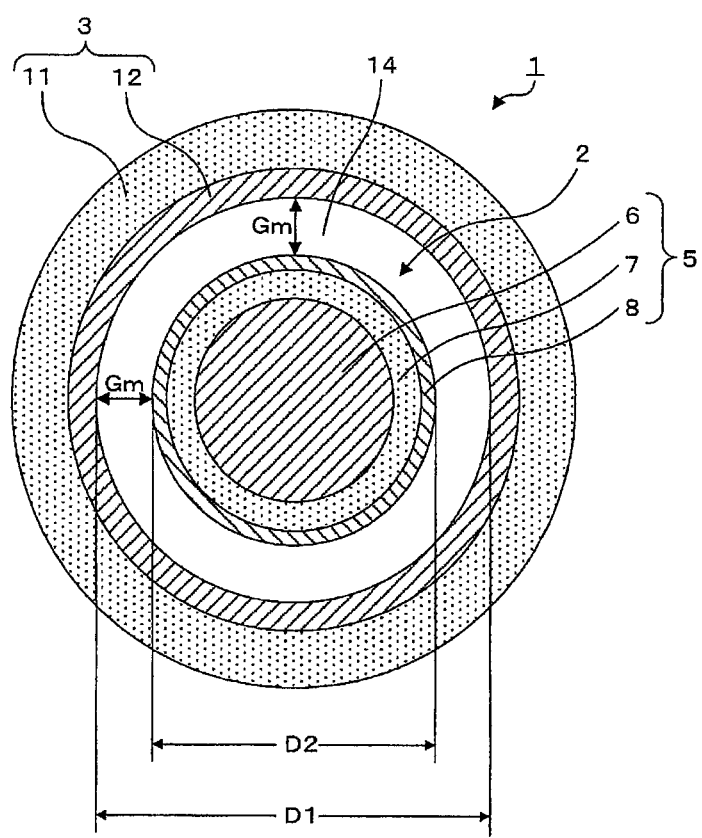
FIG. 2 is a cross sectional view when a wire section is arranged concentrically in a cylinder portion of a protective section.

On the other hand, when, for example, the electric wire 5 of the wire section 2 in the cylinder portion of the protective section 3 is located on the central axis of the protective section 3 as shown in FIG. 2, e.g., when the electric wire 5 is arranged concentrically with the protective section 3, the permissible region 14 as a cavity having an even dimension Gm is provided around the wire section 2. Therefore, the wire section 2 can move in all directions including up, down, left, right and oblique directions.

5. Method of Manufacturing Electric Cable

Next, a method of manufacturing the electric cable 1 will be briefly described.

For manufacturing the electric cable 1, firstly, the wire section 2 and the protective section 3 are separately made. Here, when making the wire section 2, the insulation layer 7 is formed on the outer periphery of the conductor 6 and the braided shield layer 8 is then formed. When making the protective section 3, the braided reinforcement layer 12 is formed and the sheath 11 is then formed.

Next, the wire section 2 is inserted into the cylinder portion of the protective section 3. At this time, the wire section 2 can be smoothly inserted into the cylinder portion of the protective section 3 by providing an appropriate dimensional difference between the inner diameter D1 of the protective section 3 and the outer diameter D2 of the wire section 2. It should be noted that the manufacturing method described herein is only an example and the electric cable 1 can be manufactured by other methods.

6. Functions and Effects of the Embodiment

In the embodiment of the invention, the permissible region 14 provided in the cylinder portion of the protective section 3 with the wire section 2 arranged therein allows the electric wire 5 of the wire section 2 to move independently from the protective section 3 in the direction orthogonal to the length direction. Therefore, the braided shield layer 8 is not strongly rubbed with the braided reinforcement layer 12 even when the electric cable 1 is bent. Wear caused by the rubbing inside the electric cable 1 is thus significantly reduced. This means that effective wear and abrasion resistance of the electric cable 1 is improved. Therefore, a decrease in tensile strength resulted from breaking of wire caused by wear and a decrease in shieldability are suppressed and it is thus possible to maintain good electrical characteristics or physical characteristics of the electric cable 1 for a long period of time.

Figure 3:
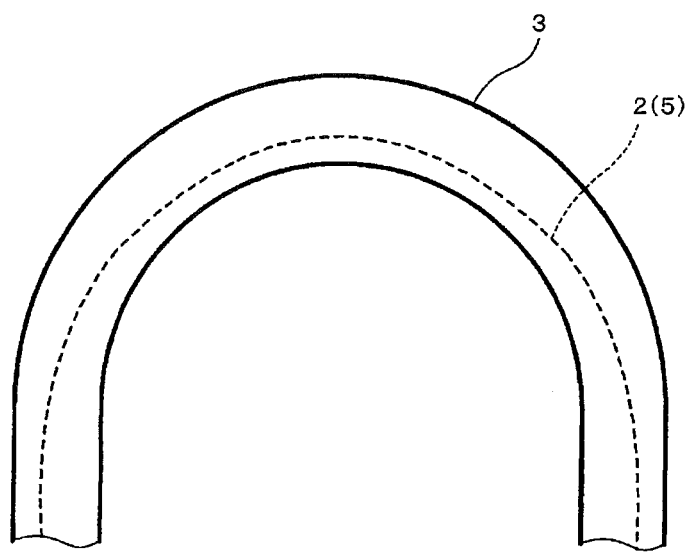
FIG. 3 is a schematic view showing a difference in curvature between the wire section and the protective section when the electric cable is bent.

In addition, when the electric cable 1 is bent, the electric wire 5 of the wire section 2 and the protective section 3 are not bent together and the electric wire 5 of the wire section 2 is bent with a smaller curvature than the protective section 3. The reason for this is that, when the electric cable 1 is bent, the electric wire 5 is bent in the cylinder portion of the protective section 3 so as to trace the out-in-out line of the curve of the bent protective section 3 as shown in FIG. 3. This reduces strain which is applied to the wire section 2 (the electric wire 5) when the electric cable 1 is bent. Therefore, it is possible to improve flex resistance of the electric cable 1.

Figure 4:
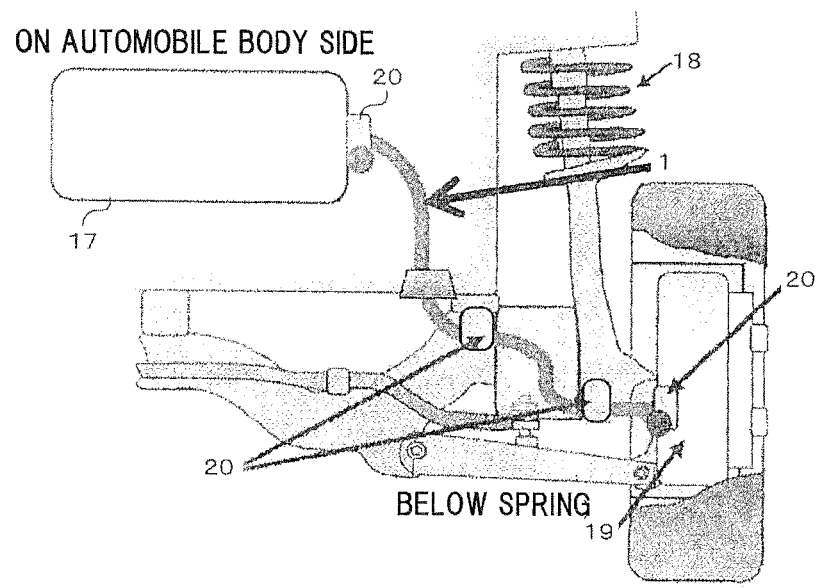
FIG. 4 is a diagram illustrating an example of how the electric cable is used.

As a result, the electric cable 1 in the present embodiment when used as, e.g., an automobile electric cable can greatly contribute to improvement in reliability and safety of automobiles. Especially in the environment in which the cable is repeatedly bent, such as when the electric cable 1 is wired using plural mounting fittings 20 between an electronic device 17 (power source, inverter, control unit, etc.) arranged on the automobile body side and an electronic device 19 (in-wheel motor, electric brake, various sensors, etc.) arranged on a wheel portion below a spring 18 as shown in FIG. 4, remarkable effects are obtained since the electric cable 1 has wear and abrasion resistance and flex resistance as mentioned above.

7. Modifications etc.

The technical scope of the invention is not to be limited to the above-mentioned embodiment and includes embodiments with various changes and modifications within the scope in which the specific effects can be obtained from the claimed elements of the present invention or combinations thereof.

Figure 5:
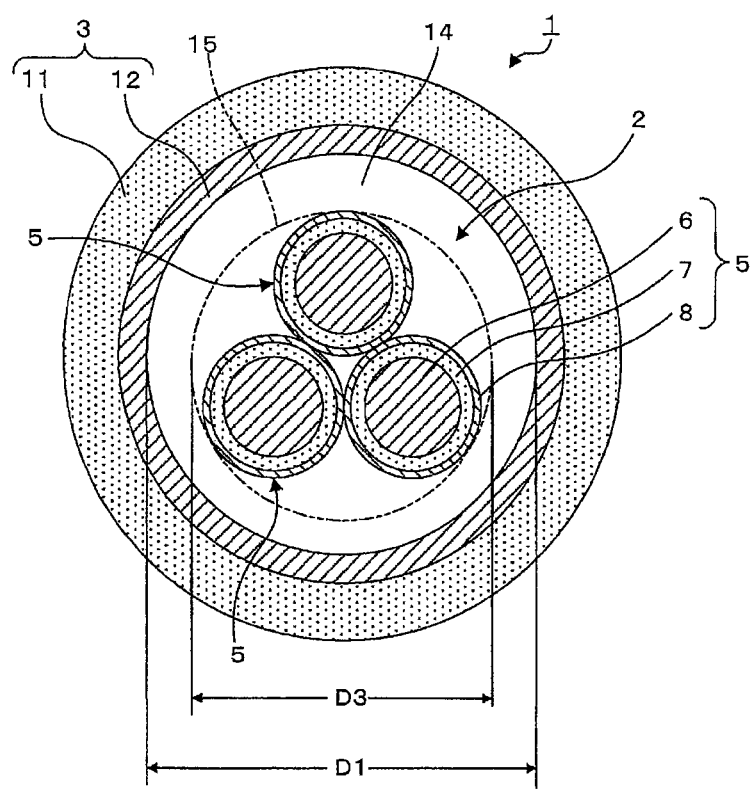
FIG. 5 is a cross sectional view showing a specific example in which the wire section is composed of plural electric wires.

For example, the wire section 2 is constituted by one electric wire 5 in the embodiment, the invention is not limited thereto. The wire section may be composed of plural electric wires. As a specific example, the wire section 2 may be composed of three electric wires 5 as shown in FIG. 5. In this case, assuming that there is a virtual circle (circumscribed circle) 15 in which the three electric wires 5 are fitted in a state of being tight contact with each other, the inner diameter D1 of the protective section 3 is set to be larger than a diameter D3 of the virtual circle 15 so that the permissible region 14 is provided in the cylinder portion of the protective section 3. In addition, the three electric wires 5 may be respectively straight wires along the length direction or may be twisted together to be used as a twisted wire.

Figure 6:
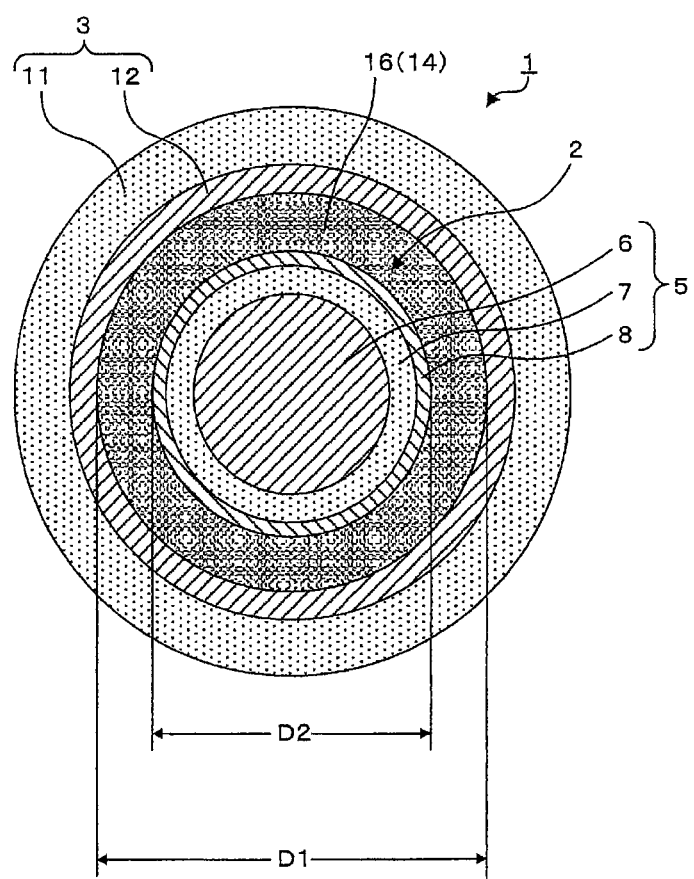
FIG. 6 is a cross sectional view showing a cable structure in which an permissible region constituted by a void is filled with a filling material.

In addition, although the permissible region 14 in the cylinder portion of the protective section 3 is a void in the embodiment, the permissible region 14 constituted by the void may be filled with, e.g., a sponge-like filling material 16, as shown in FIG. 6. This configuration allows the position of the wire section 2 to be kept on the central axis of the protective section 3 while flexibility (stretch properties) of the filling material 16 allows the wire section 2 to move in the direction orthogonal to the length direction. In addition, even when the electric cable 1 is vibrated, disorderly movement of the wire section 2 associated with the vibration can be suppressed by the filling material 16.

Furthermore, the form of the filling material 16 to fill the void as the permissible region 14 is not limited to sponge and may be, e.g., liquid (including slurry). In addition, as the liquid filling material 16, it is possible to suitably use a lubricating liquid such as oil. In case of using the lubricating liquid as the filling material 16, it is possible to impart high lubricity to each of the braided shield layer 8 and the braided reinforcement layer 12 which are in contact with the filling material 16. Therefore, it is possible to reduce obviously the wear caused by rubbing between the braided shield layer 8 and the braided reinforcement layer 12 as well as wear caused by rubbing between tinsel coppers constituting the braided shield layer 8 and wear caused by rubbing between fibers constituting the braided reinforcement layer 12.

Figure 7:
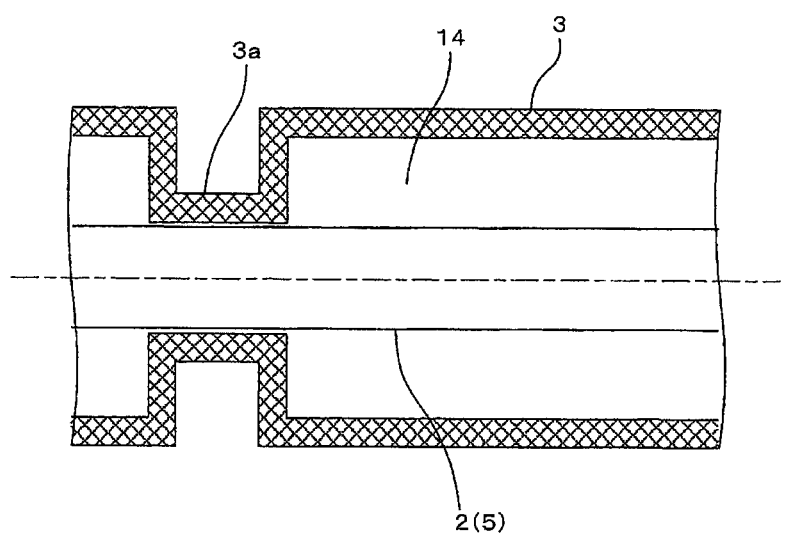
FIG. 7 is a schematic cross sectional view showing a reduced diameter portion formed at a portion of the protective section.

In addition, when the permissible region 14 is provided in the cylinder portion of the protective section 3, the permissible region 14 may be provided evenly for the entire length or may be provided only at a portion in the length direction (e.g., a portion which is repeatedly bent). In the case of the latter, as shown in FIG. 7, a reduced diameter portion 3a formed by reducing a diameter of the protective section 3 is partially formed at a portion in the length direction (the horizontal direction in the drawing), and the wire section 2 (the electric wire 5) is positioned on the central axis (indicated by a dash-dot line in the drawing) of the protective section 3 by the reduced diameter portion 3a. In this case, a slight cavity, etc., may be further provided as the permissible region 14 in the cylinder portion of the reduced diameter portion 3a of the protective section 3.

In addition, the braided shield layer 8 is formed on the outer periphery of the electric wire 5 of the wire section 2 in the embodiment but may be provided according to the need. Note that, it is preferable that the invention be applied to the electric cable 1 which is provided with both the braided shield layer 8 and the braided reinforcement layer 12. It is because wear associated with the rubbing between the braided layers can be effectively inhibited.

In addition, although the wire section 2 is provided with the braided shield layer 8 and the protective section 3 provided with the braided reinforcement layer 12 in the embodiment, the wire section 2 may be provided with the braided reinforcement layer 12 and the protective section 3 provided with the braided shield layer 8 in the opposite manner.

What is claimed is:

1. An electric cable, comprising: a wire section that comprises an electric wire comprising a conductor and a braided shield layer covering an outer periphery of the conductor and comprising a plurality of metal wires braided; and a cylindrical outer layer section covering an outer periphery of the wire section and comprising a cylindrical sheath and a braided reinforcement layer that covers an inner surface of the sheath and comprises a plurality of fibers braided, wherein the wire section is arranged inside the cylindrical outer layer section, wherein the outer layer section is constructed such that a permissible region is formed in the cylindrical outer layer section that allows a displacement of the wire section with respect to the outer layer section in a direction orthogonal to a length direction of the wire section and wherein a reduced diameter portion formed by reducing a diameter of the cylindrical outer layer section is provided at a portion in the length direction of the wire section, and the wire section is positioned on a central axis of the cylindrical outer layer section by the reduced diameter portion.

2. The electric cable according to claim 1, wherein the permissible region forms a void.

3. The electric cable according to claim 1, wherein the braided shield layer and the braided reinforcement layer are arranged adjacent to each other in the direction orthogonal to the length direction of the wire section.

4. The electric cable according to claim 1, wherein the wire section comprises an insulation layer arranged between the conductor and the braided shield layer.

5. The electric cable according to claim 2, wherein the void is filled with a filling material in the form of sponge or liquid.

6. An electric cable, comprising:
a wire section comprising an electric wire, the electric wire comprising:
a conductor;
a braided shield layer covering an outer periphery of the conductor and comprising a plurality of metal wires braided; and
an insulation layer arranged between the conductor and the braided shield layer;
a cylindrical outer layer section covering an outer periphery of the wire section and comprising a cylindrical sheath and a braided reinforcement layer that covers an inner surface of the sheath and comprises a plurality of fibers braided,
wherein the wire section is arranged inside the cylindrical outer layer section,
wherein the outer layer section is constructed such that a permissible region is formed in the cylindrical outer layer section that allows a displacement of the wire section with respect to the outer layer section in a direction orthogonal to a length direction of the wire section,
wherein the permissible region forms a void, and
wherein the void is provided between the braided shield layer and the braided reinforcement layer.

* * * * *